Figure 1:
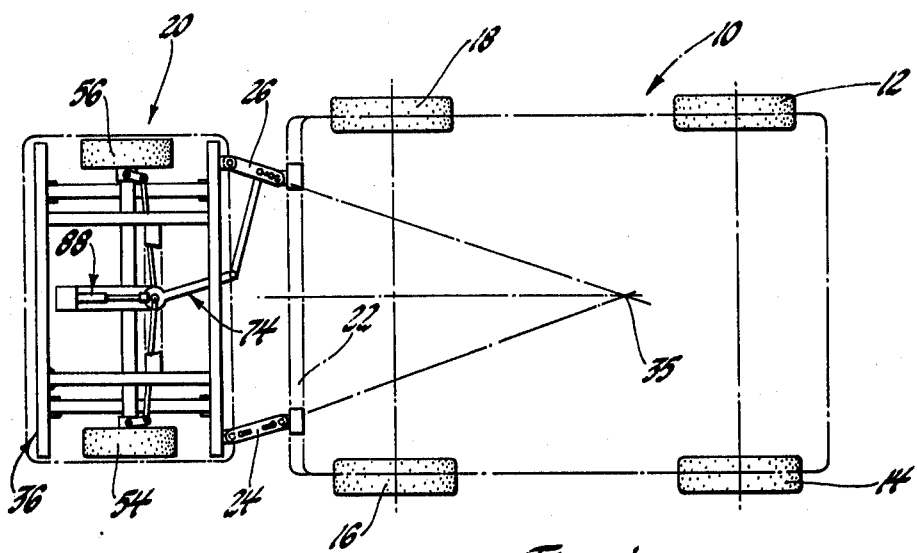

United States Patent [19]
Drewek et al.

[11] 4,042,255
[45] Aug. 16, 1977

[54] STEERABLE TRAILER FOR A SMALL VEHICLE

[75] Inventors: David F. Drewek, Sterling Heights; Dickie D. Hoffman, Utica, both of Mich.

[73] Assignee: General Motors Corporation, Detroit, Mich.

[21] Appl. No.: 741,804

[22] Filed: Nov. 15, 1976

[51] Int. Cl.² ............................................. B62D 13/06
[52] U.S. Cl. .................................. 280/445; 280/456 R
[58] Field of Search ........... 280/443, 444, 445, 456 R, 280/89, 103

[56] References Cited
U.S. PATENT DOCUMENTS

| | | | |
|---|---|---|---|
| 2,475,174 | 7/1949 | Boone | 280/456 R |
| 2,592,475 | 4/1952 | Seely | 280/443 |
| 2,734,754 | 2/1956 | Barker | 280/445 |
| 2,929,642 | 3/1960 | Dinkel | 280/443 |
| 3,168,332 | 2/1965 | Eynon | 280/423 |
| 3,787,068 | 1/1974 | Miller | 280/456 R |

Primary Examiner—Joseph F. Peters, Jr.
Assistant Examiner—R. Schrecengost
Attorney, Agent, or Firm—Edward J. Biskup

[57] ABSTRACT

A trailer that is closely coupled to the rear of a passenger vehicle and includes a steering mechanism for automatically positioning the trailer wheels in a locked, straight-ahead position when the vehicle is traveling forwardly and in a steerable mode when the vehicle is moving rearwardly.

4 Claims, 6 Drawing Figures

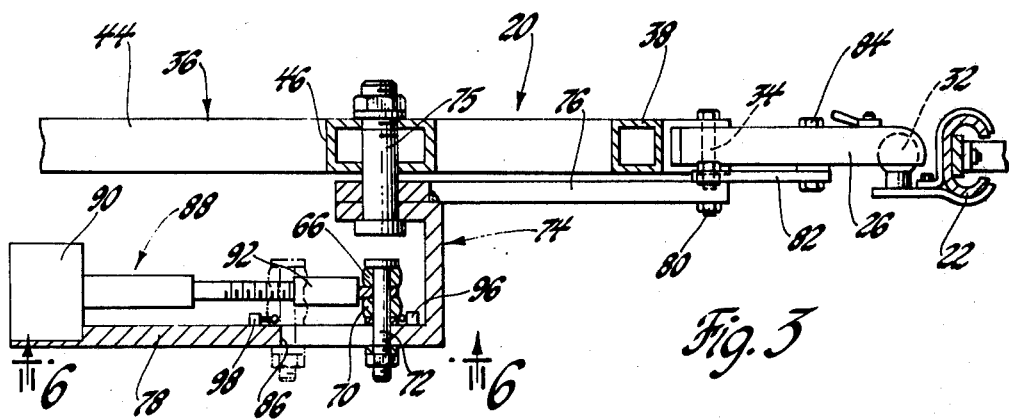

STEERABLE TRAILER FOR A SMALL VEHICLE

This invention concerns trailers and more particularly relates to a utility trailer having a steering mechanism that serves to control the position of the trailer wheels when the trailer is moving forwardly and rearwardly.

The current trend in automobile design is directed towards a family of lightweight, fuel-efficient small cars. As is well known, the availability of luggage space in small cars is somewhat limited and therefore an interest has been stimulated in small trailers which can be readily attached to the rear of the vehicle and used for luggage or other articles which can not be readily accommodated by the car.

The present invention relates to a steerable trailer that is adapted to be connected to the rear of a vehicle and comprises a frame having a transverse axle mounted thereto. The axle supports a wheel at each end thereof for steering movement about a steer axis and a steer arm is connected to each wheel for moving the associated wheel about the aforementioned steer axis. A steering member is connected to the frame for pivotal movement about a vertical axis and has the rear end thereof formed with an elongated slot that serves to accommodate a pin for shifting movement between a first position wherein the center of the pin is located at the aforementioned vertical axis and a second position wherein the pin is located a predetermined distance from the vertical axis so that the pivotal movement of the steering member causes movement of the pin only when the latter is in the second position. A pair of tie rods are connected to the pin and extend laterally outwardly in opposed directions for pivotal connection with the steer arms for imparting steering movement to the wheels. The steering member is provided with an actuator that is connected to the pin for moving the latter to the first position when the trailer is traveling forwardly and to the second position when the trailer is traveling rearwardly. In addition, means are provided for connecting the forward end of the steering member to the vehicle so when the latter is moving rearwardly in a turn with the pin located in the second position, the steering member is pivoted about the vertical axis to cause steering movement of the wheels into the turn.

The objects of the present invention are to provide a new and improved trailer that can be closely coupled to the rear of a passenger vehicle and has a pair of wheels which are locked in a straight-ahead position when the vehicle is traveling forwardly and which are automatically placed in a steerable mode when the vehicle is driven rearwardly so as to facilitate backup maneuvers; to provide an improved steering mechanism for the wheels of a trailer that is responsive to the position of the transmission selector lever for placing the wheels in a locked straight-ahead mode or in a steerable mode; to provide an improved trailer having steerable wheels which are connected by tie rods to a pin that is shiftable between two positions for placing the wheels in a locked straight-ahead mode or a steerable mode; and to provide an improved trailer for close attachment to the rear of a passenger vehicle that includes a hitch having a pair of connector links which place the instant steer center of the linkage at the neutral steer point of the vehicle and includes a steering mechanism for the trailer wheels that allows backup maneuvers without adversely affecting handling performance during forward travel.

Figure 2:
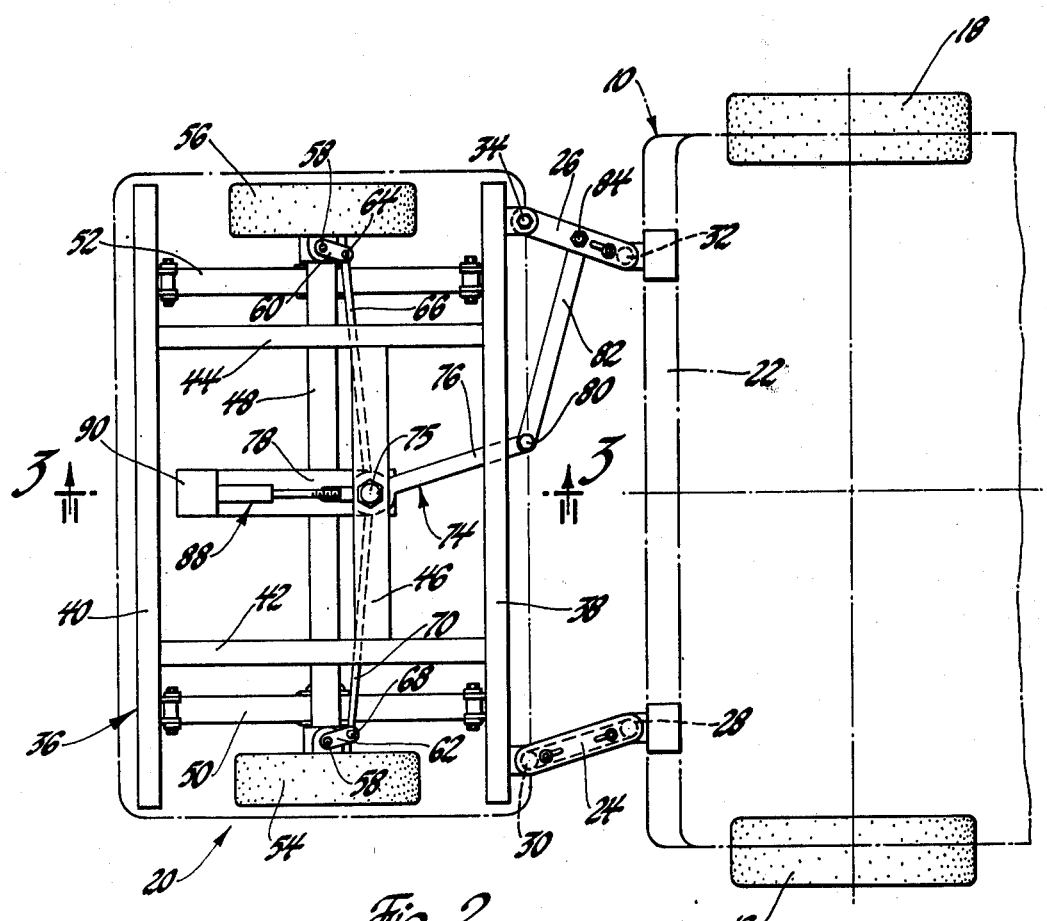

The above objects and others will be more apparent from the following detailed description when taken with the drawings in which:

FIG. 1 is a plan view showing a small passenger vehicle incorporating a trailer made in accordance with the invention, FIG. 2 is an enlarged plan view of the trailer shown in FIG. 1, FIG. 3 is an enlarged sectional view taken on lines 3—3 of FIG. 2, FIG. 4 is a view similar to FIG. 1 but shows the wheels of the trailer in a turned position, FIG. 5 is a schematic diagram of a circuit which controls energization of the actuator incorporated with the trailer shown in FIGS. 1 - 4, and FIG. 6 is a view taken on lines 6—6 of FIG. 3.

Referring to the drawings and more particularly FIGS. 1, 2 and 3 thereof, a conventional small vehicle 10 is shown having a pair of front dirigible wheels 12, 14 and a pair of rear wheels 16, 18. A trailer 20 made according to the invention is attached to the rear bumper 22 of the vehicle 10 by a pair of connector bars 24 and 26 of equal length with the connector bar 24 having the forward and rear ends thereof respectively connected to the vehicle 10 and the trailer 20 through ball and socket connections 28 and 30. The other connector bar 26 as seen in FIG. 3 has the front end thereof connected to the vehicle 10 through a ball and socket connection 32 while the rear end is connected to the trailer 20 by a vertically oriented pin 34 so that pivotal movement of the rear end of the connector bar is provided solely about a vertical axis extending through the center of the pin.

When the above described vehicle 10 is traveling forwardly along a straight line, the connector bars 24 and 26 are aligned as shown in FIGS. 1 and 2 with the longitudinal center axis of each extending towards and intersecting at the longitudinal center axis of the vehicle at a point 35 located between the front and rear wheels thereof. The purpose of the dual diagonal hitch arrangement is to place the instant center of the connector bar at the neutral steer point of the vehicle 10 during straight-ahead driving. The instant center is the point through which forces from the trailer 20 act effectively on the vehicle 10. The neutral steer point is a point through which a lateral force may be applied and no vehicle yaw displacement will result. In other words, equal slip angles occur at the front and rear wheels. This type of hitch arrangement has been found to have a minimum affect on vehicle ride and handling at high speeds and allows the trailer 20 to pitch, roll and yaw.

More specifically, the trailer 20 according to the invention, includes a frame 36 comprising front and rear transverse beams 38 and 40 rigidly interconnected by a pair of laterally spaced longitudinally extending rail members 42 and 44. The frame 36 also includes a cross member 46 which extends between and is fixedly connected to the rail members 42 and 44. A transverse axle 48 is resiliently connected to the beams 38 and 40 of the frame 36 by a pair of leaf springs 50 and 52, and the opposite ends of the axle are provided with wheels 54 and 56 each of which is connected to the associated end of the axle by a king pin 58 that provides steering movement of the wheel about a substantially vertical axis. The wheels 54 and 56 are connected with steer arms 60 and 62 respectively which serve to rotate the associated wheel about its king pin. In this regard, the steer arm 60 is pivotally connected at a point 64 to the outboard end of a tie rod 66 while the steer arm 62 is pivotally connected at a point 68 to the outboard end of a tie rod 70. As seen in FIG. 3, the inner ends of the tie rods 66 and 70 are pivotally connected to a vertically oriented pin 72 which is slidably carried by the rear portion of a steering member 74 that is mounted on the cross member 46 for pivotal movement about a vertical axis by a pivot shaft 75.

The steering member 74 consists of a forwardly extending arm 76 and a rearwardly extending support plate portion 78 which, as seen in FIG. 3, is at a lower level than the arm 76. It will be noted that the arm 76 is angled relative to the support plate portion 78 and is connected by a pivotal connection 80 to a link 82 which in turn is pivotally connected to the connector bar 26 at a point 84 located intermediate the ends thereof. As seen in FIG. 6, the support plate portion 78 is formed with an elongated slot 86 which serves to accommodate the pin 72. The support plate portion 78 also serves to carry a conventional electrically powered jack-screw actuator 88 having a reversible electric motor 90 which causes fore and aft movement of the front end 92 of the actuator which is pivotally connected to the pin 72.

It will be noted that when pin 72 is located in the forward position of FIGS. 1, 2 and 3, its longitudinal center axis is coaxial with the longitudinal center axis of the pivot shaft 75. As a result, clockwise or counterclockwise movement of the steering member 74 about the pivot shaft 75 has no affect on the trailer wheels 54 and 56 and the latter maintain the straight-ahead position shown in FIGS. 1 and 2. On the other hand, when the pin 72 is located in the phantom line rear position of FIG. 3, the center longitudinal axis of the pin 72 is offset from the center longitudinal axis of the pivot shaft 75. As a result, pivotal movement of the steering member 74 about the pivot shaft 75 will cause the tie rods 66 and 70 to impart steering movement to the wheels 54 and 56 in one direction or another depending on the direction of the pivotal movement of the steering member 74.

During normal forward operation of the vehicle 10, the pin 72 is located in the full line forward position of FIGS. 3 and 6, and accordingly, the wheels 54 and 56 of the trailer 20 are positioned and maintained in a straight-ahead movement. Whenever the automatic transmission selector lever 94 seen in FIG. 5 is placed in the R reverse position, however, the motor 90 of the jack-screw actuator 88 is energized causing the pin 72 to be shifted from the full line forward position to the phantom line rear position. Accordingly, and as seen in FIG. 4, when the vehicle 10 is driven rearwardly in a turn with the front wheels 12 and 14 rotated clockwise about their respective king pins, the connector bar 26 moves inwardly towards the trailer 20 causing the link 82 to pivot the steering member 74 clockwise about the pivot shaft 75. This movement of the steering member then causes counterclockwise steering movement of the trailer wheels 54 and 56 into the turn through the tie rods 66, 70 and the steer arms so that both the trailer 20 and the vehicle 10 move rearwardly as a unit. Similarly, when the front wheels 12 and 14 of the vehicle 10 are rotated to the phantom line position of the FIG. 4, and the vehicle 10 starts to move rearwardly, this will result in the right rear end of the vehicle 10 causing the connector bar 24 to move counterclockwise about the connection 30 towards the trailer 20. At the same time, the connector bar 26 will also pivot in a counterclockwise direction about pin 34, thereby causing the steering member 74 to move in a counterclockwise direction about the pivot shaft 75 so that the trailer wheels 54 and 56 are rotated clockwise about their respective king pins 58 into the turn.

As seen in FIG. 5, the reversible motor 90 of the jack-screw actuator 88 has a forward drive winding 90F and a rearward drive winding 90R. The windings 90F and 90R are incorporated in an electric circuit which includes limit switches 96, 98 and contacts 94A and 94B associated with the selector lever 94. Switches 96 and 98 have contacts that are normally closed and are respectively identified by reference numerals 96A and 98A. The switches 96 and 98 are mounted on the support plate 78 and are located at the front end and the rear end respectively of the slot 86 and are adapted to be engaged by the pin 72. Thus, as seen in FIG. 3, with the pin 72 positioned at the front end of the slot 86, the contacts 96A of the switch 96 are maintained open by the pin 72 and the contacts 98A of switch 98 are closed. When the actuator 88 moves the pin 72 to the rear end of the slot 86, the contacts 98A of switch 98 are opened and the contacts 96A of switch 96 close. Contacts 94A and 94B are intended to be opened and closed by the position assumed by the selector lever 94 of the transmission. Contacts 94A are normally closed and contacts 94B are normally opened in all positions of the selector lever 94 except the R reverse position. When the selector lever 94 is placed in the reverse position, contacts 94B will close and contacts 94A will open.

From the above description, it should be apparent that the electric circuit shown in FIG. 5 operates as follows. When the selector lever 94 is in D drive position, the vehicle 10 travels forwardly and the pin 72 is located in the forward end of the slot 86 so that any movement of the steering member 74 is ineffective to cause steering movement of the trailer wheels 54 and 56. During such time, the contacts 96A of switch 96 are open and the forward drive winding 90F and the reverse drive winding 90R of the motor 90 are de-energized. Afterwards, if the vehicle is stopped and the selector lever 94 is placed in the R reverse position, contacts 94B are closed and contacts 94A are opened causing energization of the reverse drive winding 90R through the normally closed contacts of switch 98. The pin 72 then is moved rearwardly in the slot 86 at which time the contacts 96A of switch 96 close. When the pin 72 moves rearwardly to the phantom line position of FIG. 3, it engages switch 98 to open contacts 98A and de-energize the reverse drive winding 90R. With the pin 72 located at the rear end of the slot 86, the steering member 74, as aforedescribed, is now capable of causing steering movement of the trailer wheels 54 and 56 when the vehicle moves rearwardly in a turn. When the selector lever 94 is again moved to the D drive position, the contacts 94A and 94B return to the full line positions shown, causing energization of the forward drive winding 90F through closed contacts 96A. The pin 72 then is moved forwardly until it returns to the full line position of FIG. 3 to again open contacts 96A of switch 96 to de-energize the forward drive winding 90F.

The converging arrangement of the connector bars 24 and 26 permits the steering member 74 to rotate in the proper direction depending upon the direction of the rearward movement of the vehicle 10. For example, if the vehicle 10 moves rearwardly in a straight line, both connector bars 24 and 26 will maintain the full line position of FIG. 2 even though the pin 72 has been located at the rear end of the slot 86, no steering movement will occur of the trailer wheels 54 and 56 and accordingly, the trailer 20 will similarly move rearwardly in a straight line. If, however, the front wheels 12 and 14 of the vehicle 10 are turned in the direction shown in full lines in FIG. 4 and the vehicle is driven rearwardly, this causes the left rear end of the vehicle 10 to move along an arcuate path about a center located at the lower end of the drawing sheet. Since the trailer wheels 54 and 56 at such time are aligned for straight-ahead movement, this will result in the connector bar 26 moving in a clockwise direction about pin 34 and causing similar movement of the steering member 74 so that the trailer wheels are rotated in a counterclockwise direction about the king pins 58 as shown in FIG. 4. A similar result occurs when the front wheels 12 and 14 of the vehicle 10 are turned to the phantom line position and the vehicle proceeds to move rearwardly with the trailer wheels 54 and 56 positioned for straight-ahead travel. In such instance and as alluded to hereinbefore, the right end of the vehicle 10 will travel in an arcuate path about a center located adjacent the top of the drawing sheet, thereby causing the connector bars 24 and 26 to rotate in a counterclockwise direction about their supports with the trailer frame 36. This causes the steering member 74 to similarly rotate in a counterclockwise direction about pivot shaft 75 causing the trailer wheels 54 and 56 to be rotated in a clockwise direction about their king pins and permitting the trailer to effectively track with the front wheels 12 and 14 of the vehicle 10.

Various changes and modifications can be made in this construction without departing from the spirit of the invention. Such changes and modifications are contemplated by the inventors and they do not wish to be limited except by the scope of the appended claims.

We claim:

1. A trailer adapted to be closely coupled to the rear end of a vehicle having a transmission provided with a manually operable lever for selectively conditioning said transmission for forward and reverse drives, said trailer comprising a frame, a transverse axle mounted to said frame and having a pair of wheels supported by the opposite ends thereof for steering movement, a mechanism for causing steering movement of said wheels when said vehicle is driven rearwardly in a turn and for maintaining said wheels in a straight-ahead position when the vehicle is driven forwardly, said mechanism including a steering member supported by said frame for pivotal movement about a vertical axis and having an arm extending forwardly for connection with said vehicle so that turning movement of the vehicle causes said steering member to pivot about said vertical axis, a pin carried by said steering member for movement between a first position wherein the center of said pin is coaxially aligned with said vertical axis and a second position wherein the center of said pin is offset from said vertical axis so that pivotal movement of said steering member about the vertical axis causes movement of the pin only when the latter is in the second position, a pair of tie rods interconnecting said pin with said wheels for causing steering movement of the wheels when said pin is in said second position and said steering member is pivoted about said vertical axis, and an actuator carried by the trailer for moving said pin to said second position when the transmission is conditioned for reverse drive.

2. A trailer adapted to be closely coupled to the rear end of a vehicle by a pair of connector bars the longitudinal center axes of which extend forwardly and intersect at a point located between the front and rear wheels of the vehicle, said trailer comprising a frame, a transverse axle suspended from said frame and having a wheel supported at each end thereof for steering movement about a steer axis, a steer arm connected to each wheel for moving the associated wheel about said steer axis, a steering member supported by said frame for pivotal movement about a vertical axis, said steering member having a forward end and a rearward end, a pin carried by said steering member for shifting movement between a first position wherein the longitudinal center axis of said pin is located at said vertical axis and a second position wherein the longitudinal center axis of said pin is located a predetermined distance from said vertical axis whereby movement of said steering member about the vertical axis causes movement of said pin only when the latter is in the second position, a pair of tie rods having the inner ends thereof connected to said pin and having the outer ends thereof extending laterally outwardly in opposed directions for pivotal connection with the steer arms associated with the wheels, an actuator connected to said pin for moving the latter to the first position when the trailer is traveling forwardly and to the second position when the trailer is traveling rearwardly, and means connecting the forward end of the steering member to the vehicle so when the latter is moving rearwardly in a turn with the pin located in the second position the steering member is pivoted about the vertical axis to cause steering movement of the wheels into the turn.

3. A trailer for connection with a vehicle, said trailer comprising a frame, a transverse axle mounted to said frame and having a wheel supported at each end thereof for steering movement about a steer axis, a steer arm connected to each wheel for moving the associated wheel about said steer axis, a steering member connected to said frame for pivotal movement about a vertical axis, said steering member having a forward end and a rear end, an elongated slot formed in the rear end of said steering member, a pin located in said slot for shifting movement between a first position wherein the center of said pin is located at said vertical axis and a second position wherein said pin is located a predetermined distance from said vertical axis whereby movement of said steering member about the vertical axis causes movement of said pin only when the latter is in the second position, a pair of tie rods connected to said pin and extending laterally outwardly in opposed directions for pivotal connection with the steer arms associated with the wheels, an actuator connected to said pin for moving the latter to the first position when the trailer is traveling forwardly and to the second position when the trailer is traveling rearwardly, and means for connecting the forward end of the steering member to the vehicle so when the latter is moving rearwardly in a turn with the pin located in the second position the steering member is pivoted about the vertical axis to cause steering movement of the wheels into the turn.

4. A trailer for connection with a vehicle having a transmission provided with a manually operable lever for selectively conditioning the transmission for forward drive and reverse drive, said trailer comprising a frame, a transverse axle suspended from said frame and having a wheel supported at each end thereof for steering movement about a steer axis, a steer arm connected to each wheel for moving the associated wheel about said steer axis, a steering member connected to said frame for pivotal movement about a vertical axis and being located between the wheels of said axle, said steering member having a forward end and a rearward end, an elongated slot formed in said steering member, a vertically oriented pin located in said slot for shifting movement between a first position wherein the longitudinal center axis of said pin is located coaxial with said vertical axis and a second position wherein said longitudinal center axis of the pin is located a predetermined distance from said vertical axis whereby movement of said steering member about the vertical axis causes movement of said pin only when the latter is in the second position, a pair of tie rods having the inner ends thereof pivotally connected to said pin and having the outer ends thereof extending laterally outwardly in opposed directions for pivotal connection with the steer arms associated with the wheels, a motor driven actuator carried by the steering member and connected to said pin for moving the latter to the first position when the transmission is conditioned for forward drive and to the second position when the transmission is conditioned for reverse drive, and means connecting the forward end of the steering member to the vehicle so when the latter is moving rearwardly in a turn with the pin located in the second position the steering member is pivoted about the vertical axis to cause steering movement of the wheels into the turn.

* * * * *